United States Patent Office 2,858,791
Patented Nov. 4, 1958

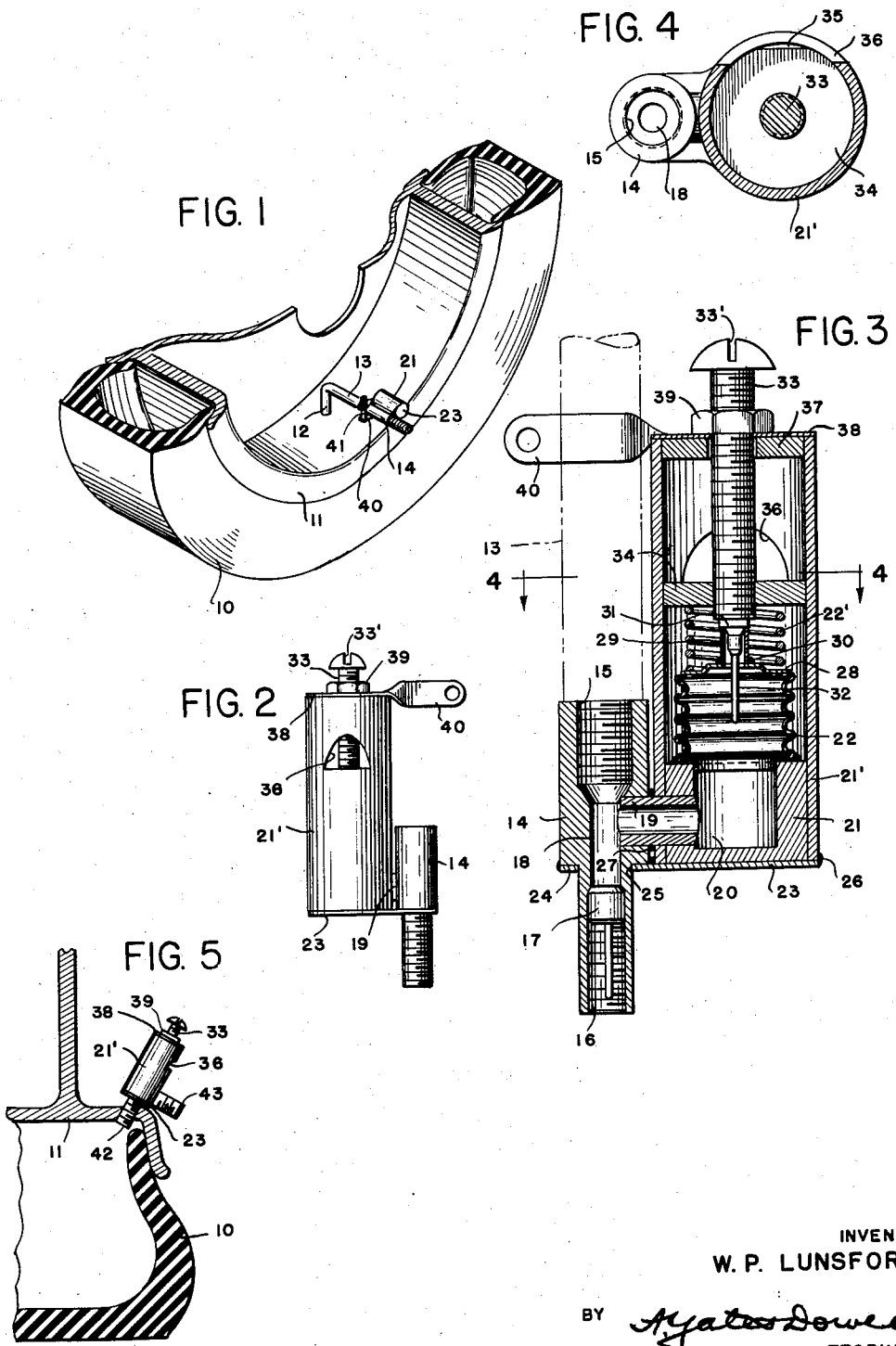

2,858,791

PRESSURE LOSS TIRE SIGNAL

Walter P. Lunsford, Jacksonville, Fla.

Application March 23, 1956, Serial No. 573,393

6 Claims. (Cl. 116—34)

This invention relates generally to indicators and detectors including those employed in signalling a condition existing, and relates specifically to devices for indicating insufficiency of pressure, for example, in pneumatic tires of automobiles as well as indicating inadequate fluid pressure in other places where it is desirable to maintain the pressure at a predetermined value and which will operate a signal for indicating a deficiency in pressure so that pressure may be restored to the desired level.

Signals of various kinds have been provided for indicating insufficiency of pressure or pressure losses within pneumatic tires. These have been complicated, bulky, expensive, unreliable, affected by temperatures, and otherwise not fully practical or satisfactory.

It is an object of the invention to provide a pressure deficiency indicator of simple and inexpensive construction which can be readily applied without difficulty, which will permit a pneumatic tire to be filled in the usual manner, in which variation of adjustment can be readily made, and in which a pressure chamber is provided which includes a heat insulating medium which is not subject to early fatigue.

Other objects and advantages of the invention will be apparent from the following description taken in conjunction with the accompanying drawing wherein:

Fig. 1 is a fragmentary perspective illustrating the application of the invention to a truck tire;

Fig. 2, a side elevation of the invention itself;

Fig. 3 is an enlarged vertical section of the invention;

Fig. 4 is a section on line 4—4 of Fig. 3; and

Fig. 5 is a section of a tire illustrating the application of a slightly modified form of the invention.

Briefly stated, the invention comprises a tube having one end internally threaded for application to a conventional valve stem and its opposite end provided with internal threads corresponding in diameter to the interior of such valve stem and in which is received the conventional valve assembly or insides.

To the interior of the intermediate portion of the tube is connected a pressure chamber defined by an elastic insulating member which has the quality of being expanded and contracted indefinitely without fatigue. The center of the outer end of this pressure chamber has a small opening in which a sleeve is located through which air can escape when the pressure drops below a predetermined value and such escaping air is employed to operate a signal such as a whistle or other signal.

In order that the whistle or signal does not sound when pressure is adequate a closure is provided for the end of the tube so that the tube and closure form an effective valve with such closure adjustably carried on an adjustable screw so that the signal may be adjusted to operate at pressure value according to the setting. The flexibility of the bellows which forms the pressure chamber may be modified by the application of a coil spring which tends to move the sleeve away from the valve seat when the pressure falls below the value at which the device is set.

The tube to the interior of the intermediate portion of which the signal is attached is adapted to be threaded on to the valve stem. A clamp is also provided for attaching the device to the valve stem so that it will not be accidentally disengaged.

With continued reference to the drawing, a truck tire 10 mounted on a rim 11 has a valve stem 12 with a laterally disposed portion 13 all of conventional construction. The valve stem has external threads for receiving valve caps and internal threads in which valve cores are insides are contained which maintain pressure within the tire. With conventional pneumatic tires and valve stems, deficiency of pressure within the tire is detected by the feel in the manner it operates or by sight.

The present invention contemplates positive indication of pressure drop and comprises a tube or fitting 14 having a large end provided with internal threads 15 of a diameter to engage with the external threads of the valve stem. The tube has a smaller end provided with threads 16 of a size to receive the external threads on the valve cord 17 which is identical with the valve core removed from the stem of the valve.

The portion of the interior or bore 18 joining the ends of the tube is connected by a tube 19 with a chamber 20 in a cup 21 having attached to its upper open end an elastic insulating bellows 22 which has the quality of being capable of being expanded and contracted indefinitely without fatigue unlike a bellows of metal which is easily fatigued. A spring 22' tends to collapse such bellows. Around the cup 21 is disposed a cylinder 21' through which the tube 19 extends. An end plate 23 is employed for closing the end of said cylinder and with a reduced portion 24 having an opening 25 in which is received the reduced end portion of the tube 14. A sealing agent 26 is utilized around the margin of the plate 23 and also to provide a seal 27 about the tube 19, solder constituting a simple form of sealing material.

The end of the bellows remote from the chamber 20 is provided with a closure disk 28 having a relatively small opening in which is mounted a sleeve 29 secured therein by solder 30, this sleeve, being carried by the bellows, is movable longitudinally with the bellows. The end of the sleeve is adapted to engage a valve seat 31 having a stem 32 extending axially within the sleeve 29 for guiding the axial movement of the movable sleeve which forms a part of the valve.

When pressure within the bellows is adequate the valve sleeve 29 will be in contact with the seat 31 so that no fluid or air can pass or escape. The amount of pressure for holding the valve closed or causing motion of the valve is variable due to the fact that the valve seat is mounted on the lower end of an external adjusting member 33 having a screwdriver slot 33'. The adjusting screw 33 is threaded through a disk 34 intermediate the ends of the cylinder 21' which has a whistle slot 35 through which the air escaping between the valve parts 29 and 31 can escape and on account of the notch 36 will produce a whistling sound, the opposite end of the cylinder being closed by plug 37. It is preferable that the notch 36 be turned toward the adjacent portion of the rim on which it is mounted to prevent water collecting within the cylinder 21'. An end plate 38 is held in place by a lock nut 39 on the screw 33 which bears against the end plate 38, such end plate having a pair of spaced perforated lugs 40 which are adapted to be connected by a bolt 41 to clamp the device in place on a valve stem as shown in Fig. 1.

As illustrated in Fig. 5, the pressure chamber may be connected with the air within the tire by means of an externally threaded nipple 42, which admits air to the interior of the cylinder and pressure chamber, and a conventional valve stem 43 may likewise be provided, otherwise the device corresponds to that of Fig. 3.

It will be obvious to those skilled in the art that various changes may be made in the invention without departing from the spirit and the scope thereof and therefore the invention is not limited by that which is shown in the drawings and described in the specification but only as indicated in the appended claims.

What is claimed is:

1. A pressure deficiency indicator for application upon the valve stem of a pneumatic tire comprising an elongated hollow body having closed end portions and an intermediate partition with a relatively small transverse opening adjacent one edge of said partition, said body having on one side of said partition an aperture cooperating with said transverse opening whereby an audible sound will be produced upon the passage of air through said opening and aperture, a flexible bellows of insulating material defining a pressure chamber on the side of said partition opposite to said aperture, an elongated member adjustable axially in said partition and extending along the end portion of said hollow body remote from said pressure chamber, a valve seat carried by said pressure chamber and a cooperating valve stem carried by said elongated member so that pressure in said bellows will maintain said valve seat in intimate engagement with said valve stem and reduction of pressure will cause said valve seat and valve stem to separate, means intermediate said partition and said bellows tending to compress said bellows, a fitting having an enlarged threaded bore for engagement with said valve stem of said tire, a second threaded bore for the reception of a conventional valve core, and a reduced bore connecting said threaded bores, a tube between said reduced bore and said bellows to provide constant communication between said bellows and said tire, and a clamp for attaching a remote portion of the device to said tire valve stem at a distance from the free end of the latter.

2. A pressure deficiency indicator for application upon the valve stem of a pneumatic tire comprising an elongated hollow body having closed end portions and an intermediate partition with a relatively small transverse opening adjacent one edge of said partition, said body having on one side of said partition an aperture cooperating with said transverse opening whereby an audible sound will be produced upon the passage of air through said opening and aperture, a bellows defining a pressure chamber on the side of said partition opposite to said aperture, an elongated member adjustable axially in said partition and extending along the end portion of said hollow body remote from said pressure chamber, a valve seat carried by said pressure chamber and a cooperating valve stem carried by said elongated member so that pressure in said bellows will maintain said valve seat in intimate engagement with said valve stem and reduction of pressure will cause said valve seat and valve stem to separate, means intermediate said partition and said bellows tending to compress said bellows, a fitting having an enlarged threaded bore for engagement with said valve stem of said tire, a second threaded bore for the reception of a conventional valve core, and a reduced bore connecting said threaded bores, a tube between said reduced bore and said bellows to provide constant communication between said bellows and said tire.

3. A pressure deficiency indicator for application to the laterally disposed valve stem of a pneumatic tire comprising a hollow body having a partition therein with an opening, said body having an aperture cooperating with said opening, whereby the passage of air through said opening in said partition and the aperture in said body will produce a signal, a threaded stem extending through said partition, an elastic insulating bellows defining a pressure chamber within said body, cooperating valve elements on said threaded stem and said bellows adapted to be maintained in contact by pressure in said bellows and to separate upon reduction of said pressure, a fitting having an enlarged threaded bore for engagement with said valve stem of said tire, a second threaded bore for the reception of a conventional valve core, and a reduced bore connecting said threaded bores, a tube between said reduced bore and said bellows to provide constant communication between said bellows and said tire, and a clamp in alignment with said fitting for clamping the device onto the valve stem of the tire.

4. A pressure deficiency indicator constructed for application upon the valve core containing valve stem of a pneumatic tire comprising a fitting having a passage with internal threads for cooperation with the external threads of said valve stem and internal threads in a location spaced from the first mentioned internal threads for receiving the external threads of said valve core, a body having a pressure chamber, a tube between the passage of said fitting between said threads and said pressure chamber for maintaining continuous communication therebetween, an elastic insulating bellows defining at least a portion of a pressure chamber and arranged to be in expanded condition while said chamber is subjected to pressure of a predetermined value and to contract upon reduction of said pressure, a valve in communication with the interior of said bellows constructed to be unseated by the contraction of said bellows and to allow the escape of air from the tire through said bellows, and a signal operable by the escaping air.

5. A pressure deficiency indicator for application to the valve stem of a pneumatic tire of an automobile comprising a fitting having a passage with internal threads for cooperation with the external threads of said valve stem of the tire and internal threads for receiving the external threads of a conventional tire valve, a body providing a pressure chamber, a tube between the passage of said fitting and said pressure chamber, an elastic insulating member defining at least a portion of said pressure chamber, a valve comprising fixed and movable members one of which is actuated by said elastic insulating member the other being adjustably carried, and a signal actuatable by fluid escaping from said pressure chamber.

6. A pressure deficiency indicator for application to a valve stem through which air is introduced under pressure to a chamber in which high pressure is adapted to be maintained comprising in combination a device adapted to have communication with said chamber, said device comprising a bellows having wall portions of flexible material, a valve constructed to be opened and closed by the operation of said bellows, said valve including a seat and a closure member carried one by said bellows and one by a separate fixed member, said seat and closure members being adjustable one relative to the other to regulate the amount of pressure required to unseat said valve, and a signal for operation by fluid escaping through said valve from said chamber when the pressure in said chamber is reduced sufficiently that the valve will open.

References Cited in the file of this patent

UNITED STATES PATENTS

| | | |
|---|---|---|
| 960,246 | Ashmore | June 7, 1910 |
| 1,502,039 | Knutson | July 22, 1924 |
| 2,037,969 | Duty | Apr. 21, 1936 |
| 2,250,077 | Henry | July 22, 1941 |
| 2,378,135 | Evans | June 12, 1945 |